March 4, 1941.　　　M. M. SIMPSON　　　2,233,491
WEEDER
Original Filed June 7, 1938　　2 Sheets-Sheet 1
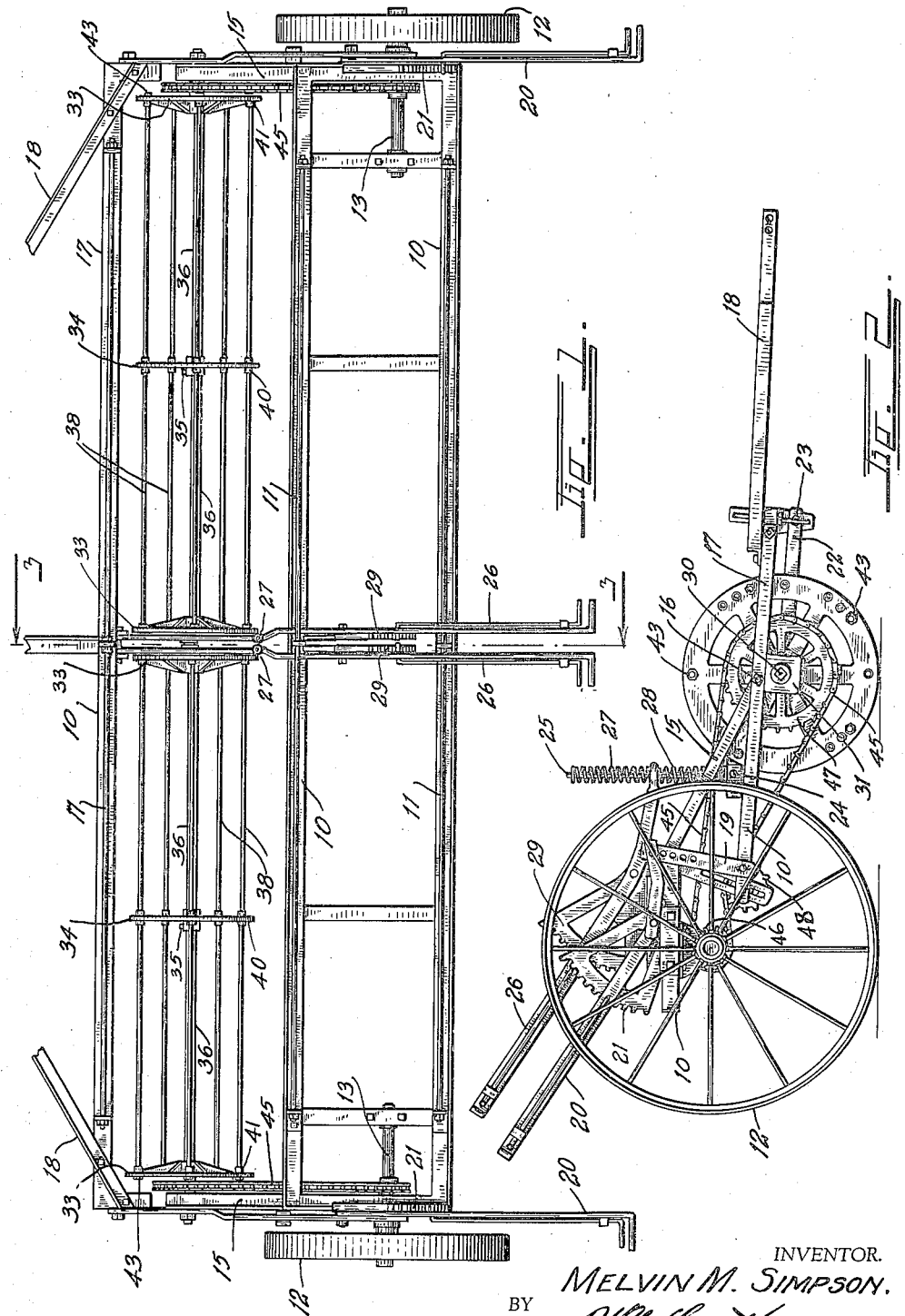
INVENTOR.
MELVIN M. SIMPSON.
BY
ATTORNEY.

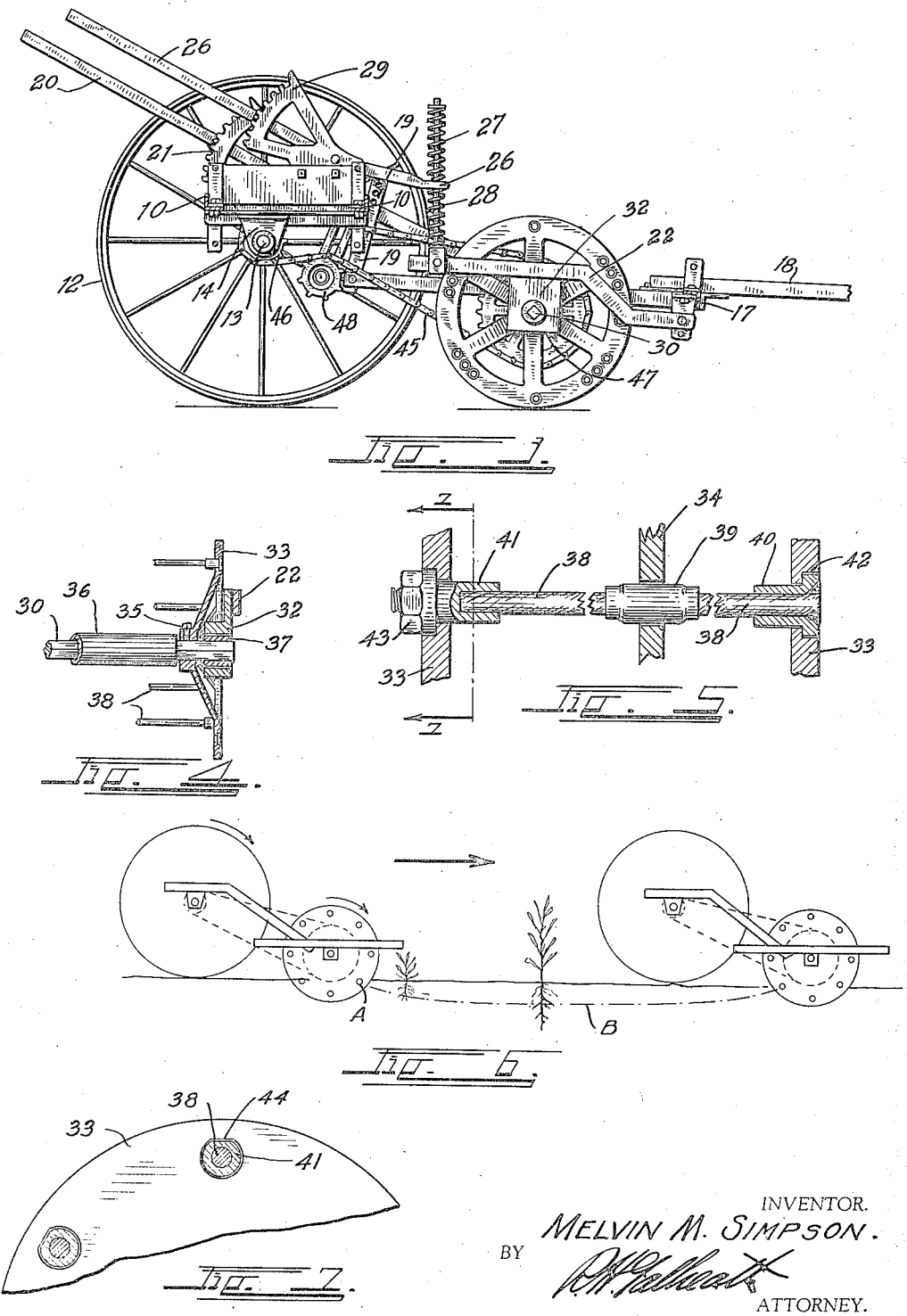

Patented Mar. 4, 1941

2,233,491

UNITED STATES PATENT OFFICE 2,233,491

WEEDER

Melvin M. Simpson, Denver, Colo.

Application June 7, 1938, Serial No. 212,255
Renewed July 26, 1940

4 Claims. (Cl. 97—42)

This invention relates to a weeding machine and is more particularly designed as an improvement over the machine illustrated and described in applicant's copending application, Serial No. 118,528.

In the type of machine illustrated in the said copending application, the weeds were removed from the ground by means of a cable reel which was drawn behind a pair of ground engaging wheels which acted as brakes to retard the rotation of the reel through the medium of traveling sprocket chains. This construction was found to have many disadvantages. Since the reel was positioned at the rear of the ground wheels, the tight side of the chains were at the bottom, causing the dirt and soil falling from the cable reel to collect and pack between the chains and sprockets and resulting in frequent broken chains. Also, the fact that the reel followed the drive wheels caused the reel to tend to climb out of the ground and it was difficult to maintain it therein except by the use of excessive weight.

The principal object of this invention is to eliminate the above objections to the former type of weeder and provide a construction in which the drive chains never pack with earth and in which the cable reel drives itself into the ground and maintains its position therein.

Other objects of the invention are: to provide a weeding machine of the cable reel type in which the drive wheels will be automatically lifted from the ground should the cable reel strike a rock or other immovable obstruction, thus allowing the wheels to spin while the cable reel moves over the obstruction without damage; to provide a floating spring construction which will flexibly support the cable reel at its proper depth position regardless of the support furnished by the soil or ground and which will allow a flexible upward as well as downward movement under control of the operator at all times; to eliminate the short cables usually used upon the cable reels of weeders of this type and replace them with a single long cable which will be solidly supported intermediate its extremities without wear upon the cable.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in views of the drawings and throughout the description.

In the drawings:

Fig. 1 is a plan view of the improved cable weeder.

Fig. 2 is a right side view thereof.

Fig. 3 is a cross section taken on the line 3—3, Fig. 1.

Fig. 4 is a detail view illustrating the construction and mounting of a typical end plate of the cable reel.

Fig. 5 is a detail view illustrating the method of mounting the cables therein.

Fig. 6 is a diagrammatic view illustrating the action of the cable reel.

Fig. 7 is a detail view taken on the line 7—7, Fig. 5, illustrating the cable tension members.

The invention employs a main frame 10, braced by suitable truss rods 11 and supported at its extremities upon ground wheels 12. The ground wheels 12 are secured on stub shafts 13 mounted in journal blocks 14.

The end members of the frame 10, shown at 15, extend forwardly and downwardly to a pivot bolt 16.

A rocking frame 17 is secured to the members 15 by the pivot bolts 16. The rocking frame extends forwardly to form an attachment tongue portion 18 by means of which the weeder may be attached to a tractor, team or other towing means. The end members of the rocking frame 17 extend rearwardly at each side of the weeder to a connection with a vertical link member 19 which is suspended from the forward extremity of a depth lever 20 at each extremity of the frame 10. The levers 20 can be set at any desired angle in tooth segment members 21.

It can be readily seen that if the tongue portion 18 is secured to the draw bar of the tractor and the levers 20 are forced rearwardly and downwardly they will elevate the entire rocking frame 17 and, when forced forwardly and upwardly, they will depress the entire frame 17.

A pair of parallel, horizontal, hinged bars 22 are pivoted at 23, at the middle of the rocking frame 17, and extend rearwardly therefrom to pivots 24 on the lower extremities of vertical spring rods 25. The spring rods 25 pass upwardly through the forward extremities of a pair of spring adjusting levers 26, there being an upper compression spring above the lever 26 and a lower compression spring 28 below each lever. The spring adjusting levers 26 can be set at any desired position by means of toothed segments 29. Thus, the hinged bars 22 are resiliently mounted between the springs 27 and 28 so as to cushion both the upward and downward movement thereof.

A pair of cable reels are journalled in the frame 17. Each reel consists of a reel shaft 30, preferably of square section, which extends from a bearing block 31, at one end member of the frame 17, to a bearing block 32 on one of the hinged bars 22. The extremities of the square shafts 30 extend into spherical bearing sleeves 37 which universally rotate in the bearing blocks 31 and 32 to allow the shafts to both rotate and tilt therein.

At each extremity of each shaft 20 is an end cable disc 33 and, intermediate the end cable discs on each shaft is an intermediate cable disc 34. The cable discs may be locked to the shaft by means of suitable set screws 35 and are held in their proper spaced relation by means of metallic tubes 36 which surround the shafts between the discs and act as spacers therefor.

A series of flexible steel cables 38 extend between the end discs 33 and through the intermediate discs 34. At the point where these cables pass through the intermediate discs, a reinforcing sleeve 39 is clamped about the cable to prevent the latter from wear against the intermediate disc.

A flanged bushing 40 is secured on one extremity of each cable. A threaded bushing 41 is secured on the other extremity thereof. The flanged bushings rest in counter-sunk holes 42 in one end plate and nuts 43 are threaded on the threaded bushings 41 and extend into the counter-sunk holes 42 of the other end plate. By this construction the tension in the cables 38 can be adjusted by rotating the nuts 43. The threaded bushings 41 are prevented from rotation due to the fact that the holes in the end plates 33 have a flat side, as shown in Fig. 7, and the threaded bushings 41 have a corresponding flat side 44 which prevents rotation thereof in the holes.

Each of the shafts 30 is connected to one of the wheels 12 by means of a drive chain 45. Each drive chain extends from a relatively small sprocket 46 on one of the wheel shafts 13 to a relatively large sprocket 47 on one of the shafts 30. The chains 45 are maintained taut by means of idler sprockets 48 on their lower reaches.

It can be seen that due to the difference in diameters between the sprockets 46 and 47 that the shafts 30 are rotated at a much slower speed than the shafts 13. It will therefore be impossible for both the wheels 12 and the cable reels to rotate in unison with the ground. The rsult is that the wheels 12 act as brakes to retard the cable reels thus causing the cables to drag over or through the ground.

The action of the weeder is illustrated diagrammatically in Fig. 6 wherein the path of a cable "A" is indicated by the broken line "B". If the device is drawing forwardly, the cable A will enter the ground and, since it moves forward at a slower rate of speed than the axis of the cable reel, it will be dragged through the ground, gradually lowering until the lowest peripheral point is reached thence gradually raising until it reaches the surface of the ground. As it drags through the earth beneath the surface, it engages the roots of the weeds therein to pull them from place. The action of only a single cable has been illustrated and described. The next successive cable will enter the ground before the first cable reaches its mid travel and will be acting at the deepest point as the first cable leaves the ground. Thus, the cables act as a continuous series of stationary drags below the surface yet their slow rotative motion allows them to raise and pull the entangled weed roots from the ground and deposit them on the surface thereof.

It will be noted that the cable reels are at all times attempting to rotate the drive wheels forwardly. This maintains the upper reaches of the chains 45 tight and allows the lower reaches to be loose. The dirt falling from the reels drops upon the loose lower reaches and soon drops from the chains without damage. There is no dirt remaining on the reels by the time the upper chains are reached so that no dirt is packed between the chains and sprockets.

It will also be noted that the drag against the ground is tending to force the lower parts of the cable drums rearwardly thus pulling the forward parts thereof downwardly into the ground so that there is no tendency to climb out of the ground as in the former constructions of cable drum weeders.

It will be also noted that should the cable drum strike a rock or other non-yielding obstruction, the tension in the upper reaches of the chains will pull upon the rear wheels to lift them from the ground so that they may spin idly while the cable drums roll upwardly over the obstruction and then return to their normal position.

Should a hole or hollow place be reached, the inner extremities of the cable drums will drop downwardly and be cushioned and suspended by the upper compression springs 27 which at all times resiliently support the inner extremities of the cable reels in their path beneath the surface.

When a rock or other obstruction is encountered, the up thrust of the cable reels is cushioned by the lower compression springs 28. The compression or pressure in either spring is adjusted by means of the levers 26 and the depth of the travel of the cable reels, and their horizontal position is adjusted by the manipulation of all of the levers 20 and 26.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A weeding machine comprising: a main frame; a stub shaft at each extremity of said main frame; a ground engaging wheel secured on each stub shaft; a sprocket secured on each stub shaft; forwardly extending members at each extremity of said main frame; a rocking frame pivoted on and extending between said forwardly extending members; attachment means extending forwardly from said rocking frame for attachment to a towing vehicle; lever means connecting the rearward portion of said rocking frame with said main frame so that the relative angle between the two frames may be varied; cable reels mounted in said rocking frame; and means for driving said cable reels from said sprockets.

2. A weeding machine comprising: a main frame; a stub shaft at each extremity of said main frame; a ground engaging wheel secured on each stub shaft; a sprocket secured on each stub shaft; forwardly extending members at each extremity of said main frame; a rocking frame pivoted on and extending between said forwardly extending members; attachment means extending forwardly from said rocking frame for attachment to a towing vehicle; lever means connecting the rearward portion of said rocking frame with said main frame so that the relative angle between the two frames may be varied; a pair of parallel, hinged bars pivotally secured to the forward portion of said rocking frame on the medial line thereof and extending rearwardly; means for raising and lowering the rearward extremities of said bars; a cable reel mounted between each bar and each extremity of said rocking frame; and means for driving said cable reels from said sprockets.

3. A weeding machine comprising: a main frame; a stub shaft at each extremity of said main frame; a ground engaging wheel secured on each stub shaft; a sprocket secured on each stub shaft; forwardly extending members at each extremity of said main frame; a rocking frame pivoted on and extending between said forwardly extending members; attachment means extending forwardly from said rocking frame for attachment to a towing vehicle; lever means connecting the rearward portion of said rocking frame with said main frame so that the relative angle between the two frames may be varied; a pair of parallel, hinged bars pivotally secured to the forward portion of said rocking frame on the medial line thereof and extending rearwardly; resilient means cushioning the upward and downward movement of the rearward extremities of said bars; a manually actuated lever for raising and lowering the rearward extremities of said bars; cushioning means for cushioning the upward and downward relative movement between said bars and said manually actuated lever; and means for driving said cable reels from said sprockets.

4. A weeding machine comprising: a main frame; a stub shaft at each extremity of said main frame; a ground engaging wheel secured on each stub shaft; a sprocket secured on each stub shaft; forwardly extending members at each extremity of said main frame; a rocking frame pivoted on and extending between said forwardly extending members; attachment means extending forwardly from said rocking frame for attachment to a towing vehicle; lever means connecting the rearward portion of said rocking frame with said main frame so that the relative angle between the two frames may be varied; a pair of parallel, hinged bars pivotally secured to the forward portion of said rocking frame on the medial line thereof and extending rearwardly; a manually actuated lever for raising and lowering the rearward extremities of said bars; cushioning means for cushioning the upward and downward relative movement between said bars and said manually actuated lever; a relatively large sprocket mounted on each cable reel; and a drive chain connecting each large sprocket with one of said first mentioned sprockets.

MELVIN M. SIMPSON.